United States Patent [19]

Hirota et al.

[11] 4,414,586
[45] Nov. 8, 1983

[54] PILOT SIGNAL RECORDING AND REPRODUCING SYSTEM

[75] Inventors: Akira Hirota, Chigasaki; Seisuke Hiraguri; Takashi Uchimi, both of Yokohama, all of Japan

[73] Assignee: Victor Company of Japan, Ltd., Yokohama, Japan

[21] Appl. No.: 308,666

[22] Filed: Oct. 5, 1981

[30] Foreign Application Priority Data

Oct. 7, 1980 [JP] Japan .............................. 55-139362
Oct. 7, 1980 [JP] Japan .............................. 55-139363

[51] Int. Cl.³ ...................... G11B 21/04; G11B 21/02
[52] U.S. Cl. ......................................... 360/70; 360/75
[58] Field of Search ............... 358/328, 329, 340, 342, 358/31; 369/47, 43; 360/70, 69, 75

[56] References Cited

U.S. PATENT DOCUMENTS

| | | | |
|---|---|---|---|
| 4,143,396 | 3/1979 | MacKenzie | 358/31 X |
| 4,208,671 | 6/1980 | Ozawa et al. | 358/829 |
| 4,315,283 | 2/1982 | Kinjo et al. | 358/342 |
| 4,340,907 | 7/1982 | Hirata et al. | 369/47 X |

*Primary Examiner*—Aristotelis M. Psitos
*Attorney, Agent, or Firm*—Posnack, Roberts, Cohen & Spiecens

[57] ABSTRACT

A pilot signal recording and reproducing system comprises a frequency generating circuit for successively generating a first frequency, a third frequency, a second frequency, and a fourth frequency in this order or in a reverse order for every recording unit of one track, where the first and second frequencies are mutually separated frequencies, selected from a first frequency group, and the third and fourth frequencies respectively are frequencies approximately equal to the first and second frequencies, selected from a second frequency group, a recording device for recording a frequency obtained from the frequency generating circuit as a pilot signal together with an information signal onto a recording medium, a comb filter for frequency-selecting pilot signals recorded on both sides of a track which is to be reproduced, where these pilot signals have mutually different frequencies and are included as crosstalk within a reproduced signal reproduced from the recording medium, a control circuit for controlling a delay time of a delay circuit within said comb filter and first and second filter circuits for respectively discriminating and separating pilot signals having mutually different frequencies obtained from the comb filter.

6 Claims, 12 Drawing Figures

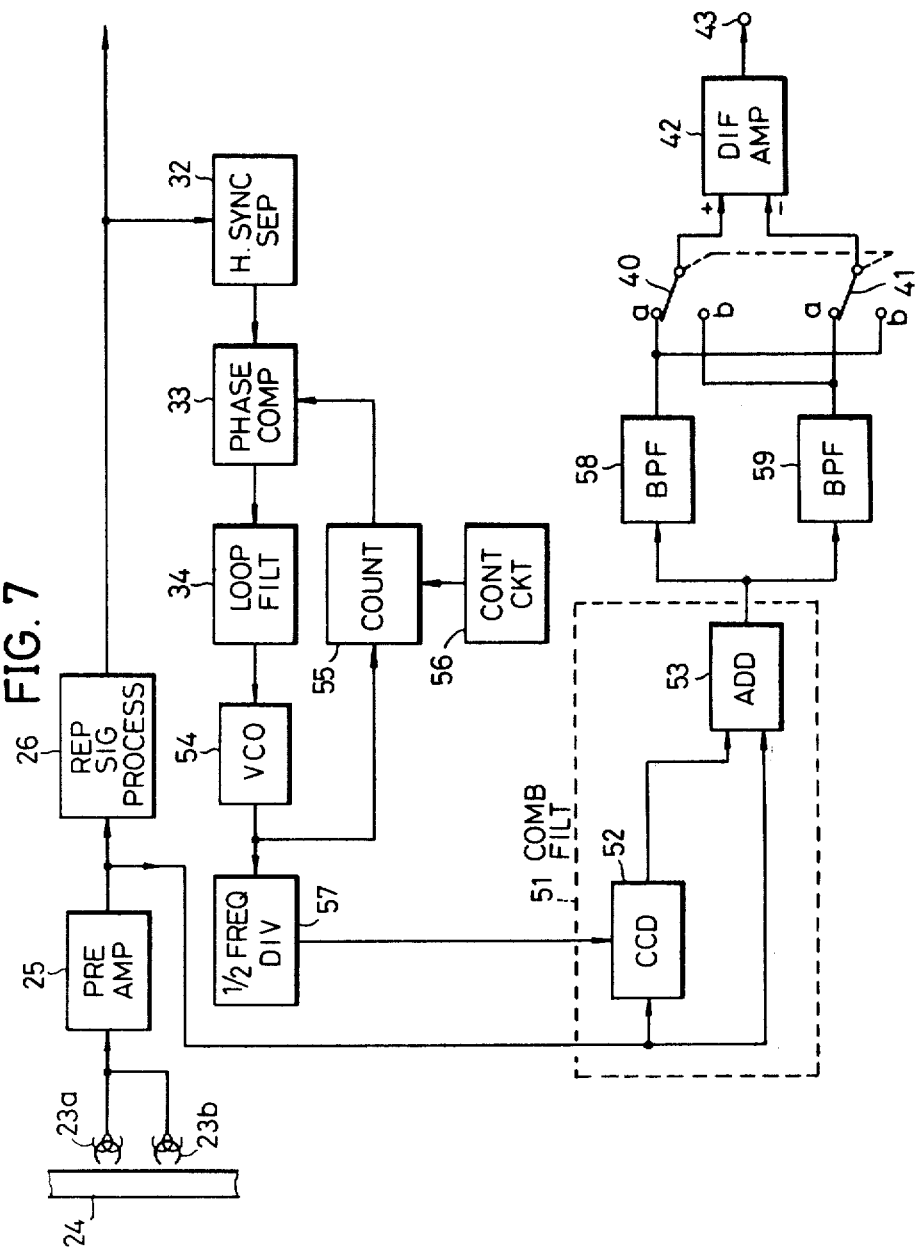

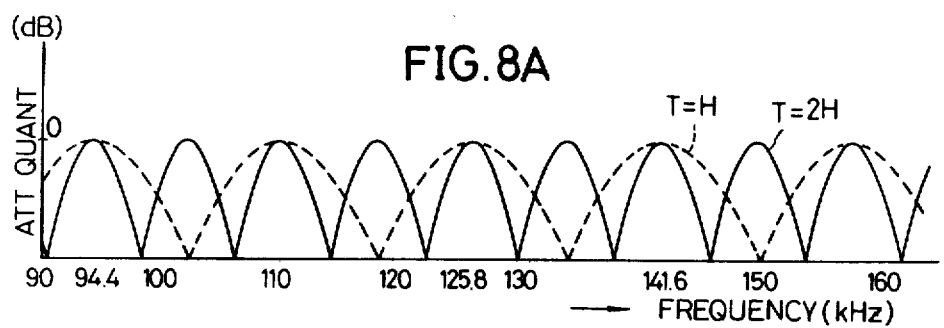
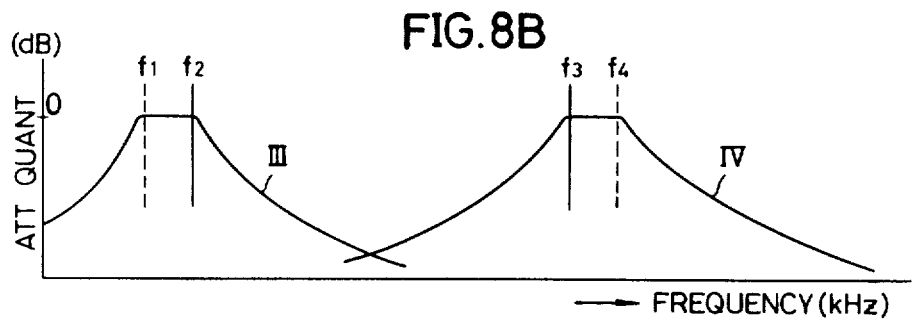
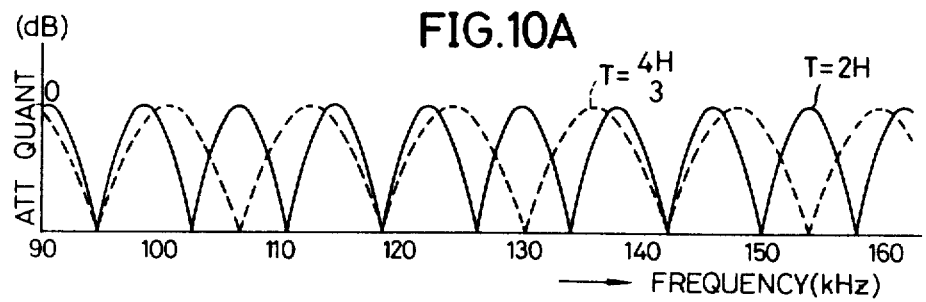
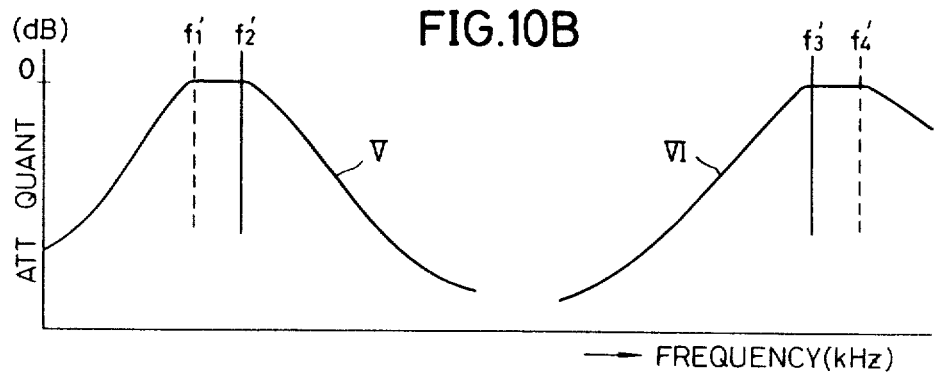

PILOT SIGNAL RECORDING AND REPRODUCING SYSTEM

BACKGROUND OF THE INVENTION

The present invention generally relates to pilot signal recording and reproducing systems, and more particularly to a pilot signal recording and reproducing system which records four kinds of pilot signals for detecting tracking error information on a recording medium by changing over the pilot signal for every track turn, and capable of reproducing the pilot signals as signals having accurate tracking error information by use of a circuit having a simple circuit construction.

Recently, in magnetic recording and reproducing apparatuses for home use (hereinafter simply referred to as a home VTR) having helical scan type rotary heads, high density recording and reproduction are becoming possible due to improvements in the magnetic tape and the realization of high density rotary heads. Accordingly, home VTRs have been manufactured which are capable of performing long-duration recording and reproduction of six hours, for example, by reducing the tape speed, the track pitch, and the like, to approximately one-third of the values for the case where two hours of recording and reproduction is possible. However, since the tape driving system in the home VTR is simplified in order to reduce the cost of the apparatus, it becomes difficult to accurately and stably maintain a desired tracking accuracy by tracing over the bends of the video track, upon high density recording and reproduction. Especially upon a so-called interchanged reproduction in which a magnetic tape recorded by a home VTR is reproduced by another home VTR, it is difficult to stably maintain the above desired tracking accuracy, and a high quality picture could not be obtained.

Hence, as a method of solving the problems with respect to tracking introduced during the above high density recording and reproduction, and eliminating the noise bar introduced during a special reproduction mode such as a slow-motion reproduction mode, a still reproduction mode, and a quick-motion reproduction mode in which reproduction is performed with a tape travelling speed which is different from that upon recording, that is, to eliminate the noise bar introduced because the head scanning locus does not accurately coincide over the recorded track, a head moving mechanism is provided in the home VTRs which are recently being developed. This head moving mechanism displaces the rotary heads in a plane which is perpendicular with respect to the rotating plane of the rotary heads, and displaces the rotary heads in a direction perpendicular with respect to the track longitudinal direction, that is, along the width direction of the track.

In a home VTR provided with the above described head moving mechanism, the rotary heads accurately follows and traces over the bends in the track, and during the special reproduction mode in which the tape travelling speed is different from that upon recording, the head scanning locus accurately follows over the track. These operations are performed by detecting a relative error information (tracking error information) between the track which is to be reproduced and the rotary head which is actually tracing over the magnetic tape, and producing a tracking error signal according to the above tracking error information to correct the tracking error of the rotary head, by use of a tracking servo circuit. In this type of a home VTR, it is extremely important and essential to accurately detect the above tracking error information when correcting the tracking error.

Conventionally, as a method of detecting the above tracking error information, there was a system in which four kinds of pilot signals were recorded in a continuous manner for each track. These four kinds of pilot signals are changed over and recorded for every recording unit of one track, so that the frequency of the pilot signal is different between mutually adjacent tracks. Upon reproduction, the frequency of the reproduced pilot signal is discriminated, and the tracking error information is detected from the above reproduced level. However, a wide frequency band was required for a filter circuit provided in the reproducing system, which was used for selecting the respective frequencies of the four kinds of pilot signals.

On the other hand, another conventional system oscillated the rotary head in the width direction of the track with a sinusoidal wave in the order of 420 Hz or 480 Hz, so that the rotary head formed a scanning locus of a sinusoidal wave shape with respect to one recorded track. In this system, the tracking error was detected from a level difference between adjacent positive peak point and negative peak point in the above scanning locus of the sinusoidal wave shape of the reproduced FM level, of the information signal which is recorded on the track as a form of frequency modulated signal (FM signal). However, in this conventional system, since the detection is performed with respect to the difference between the reproduced FM signals at the above adjacent positive peak point and negative peak point, there was a disadvantage in that errors were introduced upon detection of the tracking error due to the fact that the detecting positions were different. Moreover, in the above described conventional system, when reproduction is performed with respect to a magnetic tape which is recorded with an azimuth recording system by use of rotary heads, these rotary heads are oscillated along the width direction of the track. Accordingly, a shift was introduced in the time axis during the reproduction of the signal, and there was a disadvantage in that instability was introduced in the color and distortion was introduced in the reproduced picture due to the above shift in the time axis. Furthermore, there was a further disadvantage in this system in that, the tracking error information could not be obtained accurately with respect to a tracking error exceeding one track pitch.

SUMMARY OF THE INVENTION

Accordingly, it is a general object of the present invention to provide a novel and useful pilot signal recording and reproducing system in which the above described disadvantages have been overcome.

Another and more specific object of the present invention is to provide a pilot signal recording and reproducing system capable of obtaining the tracking error information with a relatively narrow frequency band, by successively recording signals having at least four kinds of predetermined frequencies as pilot signals together with the information signal by changing over these pilot signals in a cyclic manner for every track, and by discriminating and reproducing two kinds of pilot signals reproduced from tracks on both sides of the track which is to be scanned upon reproduction. The system of according to present invention is particularly effective when applied to a helical scan type magnetic recording and reproducing apparatus, a disc reproducing apparatus, and the like, which are constructed to control and displace the head so that the head follows the bends and the like of the track.

Still another object of the present invention is to provide a pilot signal recording and reproducing system which is capable of discriminating and obtaining only the pilot signal reproduced as crosstalk, by use of a circuit having a simple circuit construction in which the number of filter circuits used for selecting the frequency of the reproduced pilot signal is reduced.

Another object of the present invention is to provide a pilot signal recording and reproducing system capable easily discriminating the pilot signal even when the fluctuation components such as wow and flutter are included in the reproduced signal, by setting the pilot signal frequency to a value related to the horizontal scanning frequency.

Still another object of the present invention is to provide a pilot signal recording and reproducing system which is capable of effectively reproducing pilot signals of adjacent tracks as crosstalk even in a magnetic recording and reproducing apparatus of the azimuth recording and reproducing system, by selecting the frequency of the pilot signal to a frequency which is lower than the recorded frequency band of the information signal.

Other objects and further features of the present invention will be apparent from the following detailed description when read in conjunction with the accompanying drawings.

BRIEF DESCRIPTION OF THE DRAWINGS

FIG. 7 is a systematic block diagram showing a second embodiment of a reproducing system in the system according to the present invention;

FIGS. 8A and 8B are diagrams respectively showing frequency characteristics of a comb filter and a bandpass filter shown in FIG. 7;

FIGS. 10A and 10B are diagrams respectively showing frequency characteristics of a comb filter and a bandpass filter shown in FIG. 9.

DETAILED DESCRIPTION

Figure 1:
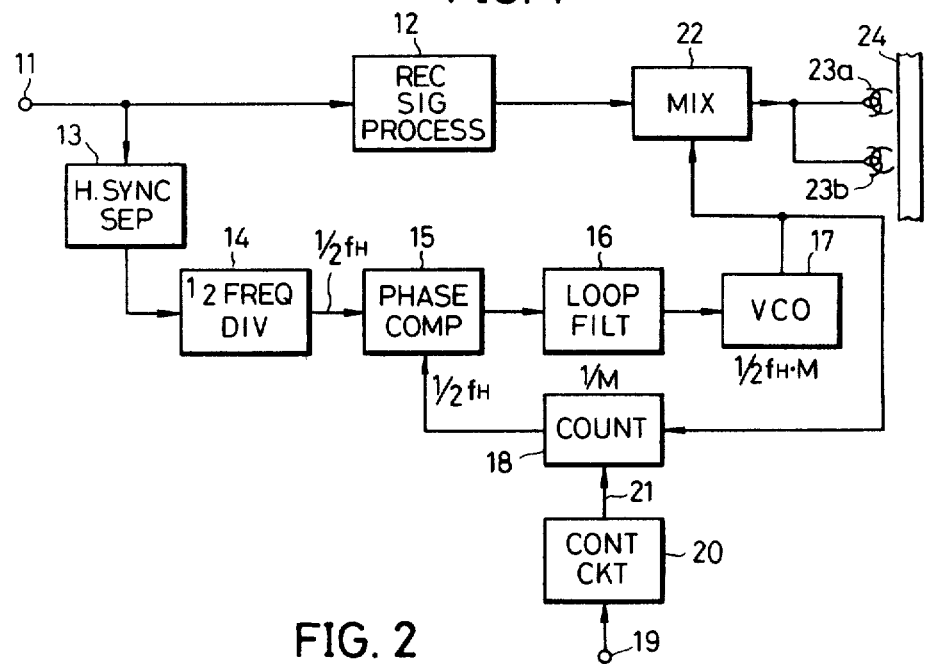
FIG. 1 is a systematic block diagram showing a recording system in a first embodiment of a pilot signal recording and reproducing system according to the present invention.

In FIG. 1, an incoming composite video signal applied to an input terminal 11, is supplied to a recording signal processing circuit 12 wherein the signal is converted into a frequency-modulated signal of a predetermined frequency band. On the other hand, the signal from the input terminal 11 is also supplied to a horizontal synchronizing signal separation circuit 13. A horizontal synchronizing signal obtained from the horizontal synchronizing signal separation circuit 13 is supplied to a ½-frequency divider 14 wherein the frequency of the signal is divided into ½ that of the original frequency, and then supplied to a phase comparator 15.

An output error voltage from the above phase comparator 15 is supplied to a voltage controlled oscillator (VCO) 17 through a loop filter 16 to variable control the output oscillation frequency of the VCO 17. The output oscillation frequency of the above VCO 17 is frequency-divided by a counter 18, and converted into a frequency $\frac{1}{2}f_H$ which is ½ of the horizontal scanning frequency $f_H$. This signal having the frequency of $\frac{1}{2}f_H$ is supplied to the phase comparator 15 wherein the phase of the signal is compared with that of the signal having the frequency of $\frac{1}{2}f_H$ which is obtained from the ½-frequency divider 14. That is, the above phase comparator 15, loop filter 16, the VCO 17, and the counter 18 construct a known phase locked loop (PLL). When the frequency dividing ratio of the counter 18 is assumed to be 1/M, the output oscillation frequency of the VCO 17 becomes $f_H/2 \cdot M$, which is a signal synchronized with respect to the output signal of the ½-frequency divider 14.

The above frequency dividing ratio 1/M of the counter 18 is varied according to a control signal applied to the counter 18 from a control circuit 20 through a line 21. The control circuit 20 successively changes over and produces a control signal having a different value every time rotary heads 23a and 23b alternately form tracks on a magnetic tape 24 according to a drum pulse obtained from an input terminal 19. The above rotary heads 23a and 23b have mutually different azimuth angles.

For example, the frequency dividing ratio of the counter 18 is successively chaged over in a cyclic manner between four kinds of frequency dividing ratios, that is, 1/12, 1/19, 1/20, 1/13, 1/12,—, every time one track is formed. As a result, the output oscillation frequency of the VCO 17 is successively changed over every recording unit of one track, that is, in the order $6f_H$ (=f1), $(19/2)f_H$ (=f3), $10f_H$ (=f4), and $(13/2)f_H$ (=f2). These signals from the VCO 17 having four kinds of output oscillation frequencies are supplied to a mixing circuit 22. Accordingly, the signals from the VCO 17 are frequency-divided and mixed with the FM video signal from the recording signal processing circuit 12 at the above mixing circuit 22, and alternately recorded onto the magnetic tape 24 by the rotary heads 23a and 23b.

Figure 2:
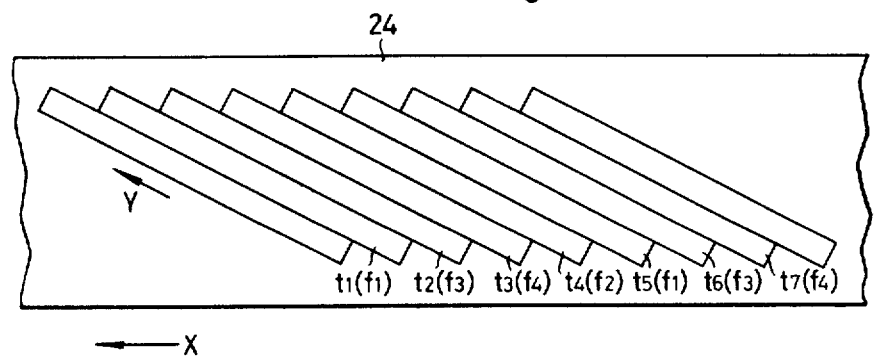
FIG. 2 is a diagram showing an example of a track pattern on a magnetic tape which is recorded with and reproduced by the system according to the present invention.

FIG. 2 is a diagram showing a track pattern recorded and formed on the magnetic tape 24 which travels towards a direction of an arrow X, by the rotary heads 23a and 23b which scan towards a direction of an arrow Y. Tracks t1, t2, t3, t4, t5, t6, t7,—, which are inclined with respect to the longitudinal direction of the magnetic tape 24, are successively formed in that order. Pilot signals respectively having frequencies of f1, f3, f4, f2, f1, f3, and f4 are recorded in the tracks t1, t2, t3, t4, t5, and t6, together with the frequency-modulated composite video signal. Moreover, the above tracks t1, t3, t5, t7,—, are recorded and formed by the rotary head 23a, while the tracks t2, t4, t6,—, are recorded and formed by the rotary head 23b.

In the present embodiment of the invention, a first frequency f1 and a second frequency f4 which are mutually separated frequencies, are respectively selected from a first frequency group consisting of i frequencies, satisfying equation (1). In the equation (1), $N_i$ are arbitrary natural numbers amounting to i, f is a predetermined frequency which is equal to the horizontal scanning frequency $f_H$ in this case.

$$f_{ai} = N_i f \qquad (1)$$

Furthermore, a third frequency f2 which is approximtely equal to f1 and a fourth frequency f3 which is approximately equal to f4, are respectively selected from a second frequency group consisting of j frequencies satisfying equation (2). In the equation (2), $N_j$ are arbitrary natural numbers amounting to j.

$$f_{bj} = (2N_j - 1)(f/2) \qquad (2)$$

As shown in FIG. 2, the signals having the frequencies f3, f4, f2, and f1 are successively changed over and recorded in that order (or in a reverse order) for every recording unit of one track. Upon reproduction, the tracking error information is obtained from the pilot signal reproduced as crosstalk.

The above pilot signals f1 through f4 can be expressed by a following equation (3), for example, and possesses a frequency band which is lower than the frequency band of the frequency-modulated composite video signal.

$$\left. \begin{array}{l} f1 = 6f_H = 94.4 \text{ kHz} \\ f2 = (2 \times 7 - 1)\dfrac{f_H}{2} = 102.3 \text{ kHz} \\ f3 = (2 \times 10 - 1)\dfrac{f_H}{2} = 149.5 \text{ kHz} \\ f4 = 10f_H = 157.3 \text{ kHz} \end{array} \right\} \qquad (3)$$

Figure 3:
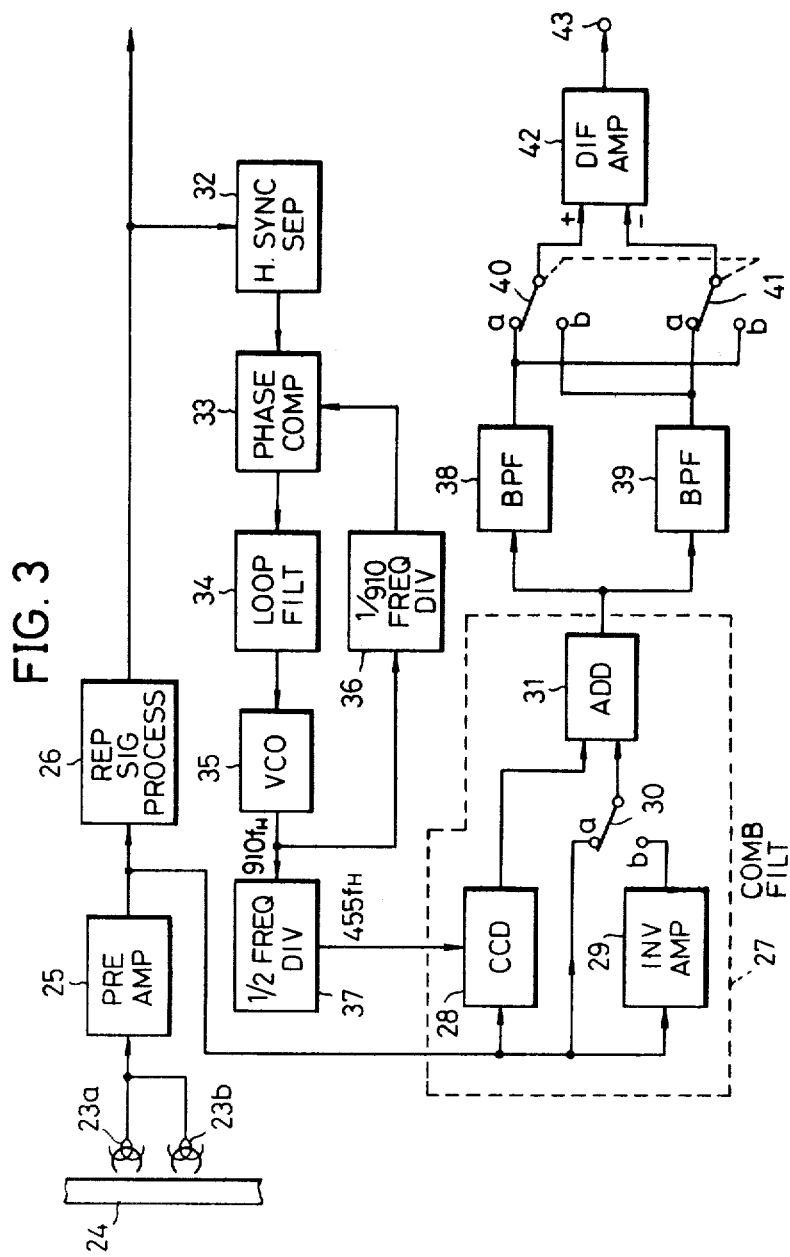
FIG. 3 is a systematic block diagram showing a reproducing system in the first embodiment of the pilot signal recording and reproducing system according to the present invention.

Next, description will be given with respect to a first embodiment of a reproducing system of a system according to the present invention. FIG. 3 is a systematic block diagram showing the first embodiment of the reproducing system according to the present invention. In FIG. 3, the signal reproduced in an alternate manner by the rotary heads 23a and 23b from the magnetic tape 24 having the track pattern indicating in FIG. 2, is supplied through a preamplifier 25 to a reproduced signal processing circuit 26, a charge coupled device (CCD) 28 which is shown as an example of a variable delay element, an inverting amplifier 29, an inverting amplifier 29, and a fixed terminal a of a changeover switch 30.

The reproduced composite video signal obtained from the reproduced signal processing circuit 26 is supplied to a horizontal synchronizing signal separation circuit 32 wherein only the horizontal synchronizing signal is separated, and then supplied a phase comparator 33. The phase comparator 33 constructs a PLL together with a loop filter 34, a VCO 35, and a 1/910-frequency divider 36. Accordingly, a signal having a frequency of $910f_H$ which is synchronized with the reproduced horizontal synchronizing signal, is produced from the VCO 35.

The signal having the output oscillation frequency of $910f_H$ which is obtained from the VCO 35, is supplied to a ½-frequency divider 37 wherein the frequency of the signal is converted into $455f_H$, and then applied to the CCD 28 as a clock pulse. The CCD 28 is constructed from 455 steps. Accordingly, since the clock pulse frequency is $455f_H$, the reproduced signal from the preamplifier 25 is produced after delaying the signal by 1H, where H indicates a horizontal scanning period. The delayed output, that is, the reproduced signal of the above CCD 28 is supplied to one input terminal of an adder 31.

A reproduced signal which is not delayed, or a reproduced signal which is inverted and amplified by the inverting amplifier 29 having a gain of $0_{dB}$, is supplied to the other input terminal of the adder 31, through the changeover switch 30 which is constructed to alternately change over the connection ever reproducing unit of one track performed by the rotary heads 23a and 23b. Therefore, during the reproducing period of one track in which the changeover switch 30 is connected to the fixed terminal a, the reproduced signal is added with the delayed reproduced signal at the adder 31. During the next reproducing period of one track in which the changeover switch 30 is connected to a fixed terminal b, subtraction is performed between the reproduced signal and the delayed reproduced signal at the adder 31.

That is, the above CCD 28 and the adder 31 or the inverting amplifier 29 construct a so-called comb filter 27. Hence, the pilot signals f1 and f4 of the above first frequency group are produced during the reproducing period of one track in which the changeover switch 30 is connected to the fixed terminal a, however, the pilot signals f2 and f3 of the above second frequency group are not produced. On the other hand, the pilot signals f2 and f3 are produced during the reproducing period of one track in which the changeover switch 30 is connected to the fixed terminal b, however, the pilot signals f1 and f4 are not produced in this case. Signals obtained at the output end of the above adder 31 are supplied to bandpass filters 38 and 39.

Figure 4:
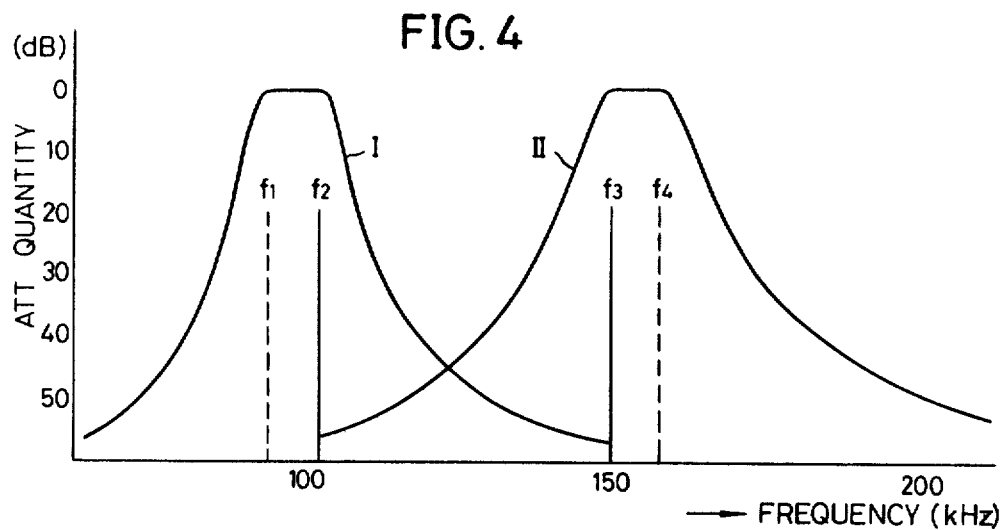
FIG. 4 is a diagram showing a frequency characteristic of a bandpass filter shown in FIG. 3.

As indicated by a curve I shown in FIG. 4, the bandpass filter 38 has a frequency characteristic for respectively filtering the pilot signals f1 and f2. On the other hand, as indicated by a curve II shown in FIG. 4, the bandpass filter 39 has a frequency characteristic for respectively filtering the pilot signals f3 and f4. The output signal of the bandpass filter 38 is supplied to fixed terminals a and b of a changeover switch 40. Moreover, the output signal of the bandpass filter 39 is supplied to fixed terminals a and b of a changeover switch 41.

The above described changeover switches 30, 40, and 41 are respectively changed over and controlled according to the tracks reproduced by the rotary heads 23a and 23b. Accordingly, during the period in which the rotary heads 23a and 23b reproduce a track recorded with the pilot signal f1 or f3, the changeover switches are respectively connected to the fixed terminals a. On the other hand, during the period in which the rotary heads 23a and 23b respectively reproduce a track recorded with the pilot signal f2 or f4, the changeover switches are connected to the fixed terminals b. As a result, at the output end of the adder 31, only the pilot signals reproduced as crosstalk from tracks adjacent to the track the rotary head 23a or 23b is to reproduce, and the pilot signal from the track which is to be reproduced does not appear at the output end of the adder 31. Moreover, the pilot signals which are always reproduced as crosstalk from the tracks on the upper side and the lower side of the track which is to be reproduced by the rotary head 23a or 23b, that is, from the adjacent tracks on both side of the track which is to be reproduced, are respectively supplied to a positive phase input terminal and an inverting phase input terminal of a differential amplifier 42. Therefore, a tracking error detection voltage is produced from the above differential amplifier 42 through an output terminal 43.

For example, when the rotary head 23a shifts towards the upward direction in FIG. 2 and travels during a period in which the track t5 recorded with the pilot signal f1 is reproduced, the crosstalk level of the pilot signal f3 becomes relatively high compared to the crosstalk level of the pilot signal f2. Accordingly, the output tracking error detection voltage of the differential amplifer 42 becomes low compared to a case where no tracking error exists. On the other hand, when the rotary head 23a shifts towards the downward direction (towards the direction of the track t4) in FIG. 2, the crosstalk level of the pilot signal f3 becomes relatively high compared to the crosstalk level of the pilot signal f2. Hence, in this case, the output tracking error detection voltage of the differential amplifier 42 becomes high compared to the case where no tracking error exists.

Next, during a reproducing period in which the rotary head 23b reproduces the track t6 which is recorded with the pilot signal f3 together with the frequency-modulated video signal, the reproduced pilot signal f3 obtained from the track t6 which is to be reproduced is intercepted at the above described comb filter 27. Furthermore, after the pilot signals f1 and f4 which are reproduced from adjacent tracks as crosstalk are filtered, the pilot signals f1 and f4 are respectively filtered at the bandpass filters 38 and 39. In addition, during the reproducing period in which the track t6 recorded with the above pilot signal t6 is reproduced, the changeover switches 40 and 41 are respectively connected to the fixed terminals a. Thus, the pilot signals f1 and f4 which are reproduced as crosstalk and obtained from the bandpass filters 38 and 39, are applied to the positive phase and negative phase input terminals of the differential amplifier 42.

Therefore, in the above case, when reproduction is performed in a state where the rotary head 23b is shifted towards the upward direction in FIG. 2, that is, towards the pilot direction of the track t7, the crosstalk level of the pilot signal f4 becomes relatively high compared to the crosstalk level of the pilot signal f1. Accordingly, the output tracking error detection voltage produced from the differential amplifier 42 through the output terminal 43 becomes low compared to the case where no tracking error exists. Further, when reproduction is performed in a state where the rotary head 23b is shifted towards the downward direction in FIG. 2, that is, towards the direction of the track t5, the output tracking error detection voltage of the differential amplifier 42 becomes high compared to the case where no tracking error exists.

In the example shown in FIG. 2, the pilot signal f4 of the recorded track t7 is then reproduced by the rotary head 23a. As is clear from the description above, during this reproducing period, the pilot signals f2 and f3 which are reproduced from the adjacent tracks as crosstalk are produced from the bandpass filters 38 and 39. Moreover, the output tracking error detection voltage obtained from the differential amplifier 42 becomes low when the tracking error is towards the upward direction in FIG. 2, and becomes high when the tracking error is towards the downward direction.

Similarly, during the reproducing period in which the track recorded with the pilot signal f2 is reproduced, the output tracking error detection voltage obtained from the differential amplifier 42 becomes low when the tracking error which is introduced is towards the upper direction in FIG. 2, and becomes high when the tracking error which is introduced is towards the downward direction.

Hence, pilot signals from adjacent tracks on both sides of the track which is to be reproduced are obtained from the bandpass filters 38 and 39 in the above described manner. When reproduction is performed by the rotary head 23a or 23b in the state where the tracking error which is introduced is towards the upward direction in FIG. 2, the tracking error detection voltage obtained from the differential amplifier 42 through the output terminal 43 becomes a low value in accordance with the tracking error quantity. On the other hand, when reproduction is performed by the rotary head 23a or 23b in the state where the tracking error which is introduced is towards the downward direction in FIG. 2, the tracking error detection voltage obtained from the differential amplifier 42 through the output terminal 43 becomes a high value in accordance with the tracking error quantity. Therefore, it is clear that the tracking error can be corrected according to the above tracking error detection voltage.

Figure 5:
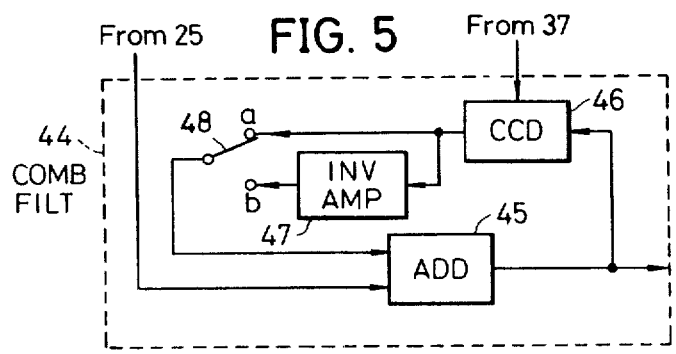
FIG. 5 is a systematic block diagram showing another embodiment of an essential part of a reproducing system in the system according to the present invention.

FIG. 5 shows another embodiment of the comb filter 27 which is indicated by dotted lines in FIG. 3. In this embodiment of a comb filter 44, an output signal of an adder 45 is delayed by 1H at a CCD 46. In addition, this delayed signal and a delayed signal obtained by inverting and amplifying a signal at an inverting amplifier 47, are alternately passed through a changeover switch 48 for every reproducing unit of one track and supplied to the adder 45. The above signal supplied to the adder 45 is added with the reproduced signal obtained from the above described preamplifier 25. Hence, by this embodiment of the comb filter, the selectivity of the comb filter can be improved.

Figure 6:
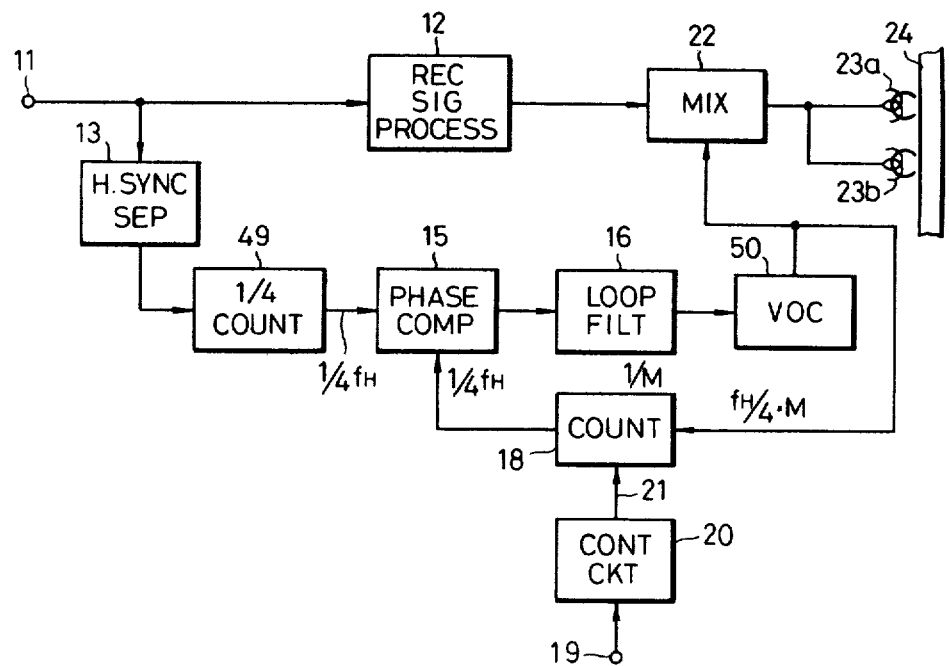
FIG. 6 is a systematic block diagram showing a second or a third embodiment of a recording system in the system according to the present invention.

Next, description will be given with respect to second and third embodiments of the system according to the present invention. FIG. 6 is a systematic block diagram showing the second or third embodiment of the system according to the present invention. In FIG. 6, those parts which are the same as those corresponding parts in FIG. 1 are designated by like reference numerals, and their description will be omitted. The horizontal synchronizing signal which is separated and obtained from the horizontal synchronizing signal separation circuit 13, is supplied to a $\frac{1}{2}$-frequency divider 49 shown in FIG. 6. The frequency of the signal thus supplied to the $\frac{1}{2}$-frequency divider 49 is divided into $\frac{1}{2}$ the original frequency, and then supplied to the phase comparator 15. The phase of the signal supplied to the phase comparator 15 is compared with the phase of a signal having a frequency of $\frac{1}{4}f_H$ which is $\frac{1}{4}$ the horizontal scanning frequency $f_h$. This signal having a signal of $\frac{1}{4}f_H$ is obtained from the counter 18 which frequency-divides the output oscillation frequency of the output obtained from a VCO 50. A phase compared error voltage obtained from the phase comparator 15 is applied to the VCO 50 through the loop filter 16, in order to variable control the output oscillation frequency of the VCO 50. Therefore, when the frequency dividing ratio of the counter 18 is assumed to be 1/M, the output oscillation frequency of the VCO 50 becomes $f_H/4M$, and the signal obtained from the VCO 50 becomes a signal which is synchronized with the output signal of the ¼-frequency divider 49.

In addition, the frequency dividing ratio of the counter 18 is successively changed over in a cyclic manner every time one track is formed, into four kinds of frequency dividing ratios, namely 1/25, 1/34, 1/35, and 1/26, by the output signal of the control circuit 20. As a result, the output oscillation frequency of the VCO 50 is changed over to $(25/4)f_H$ (=f1), $(34/4)f_H$ (=f3), $(35/4)f_H$ (=f4), and $(26/4)f_H$ (=f2) in that order, for every recording unit of one track. The signal from the VCO 50 having the above output oscillation frequency is supplied to the mixing circuit 22 as a pilot signal. Hence, the signal from the VCO 50 is frequency-divided and multiplexed with the frequency-modulated video signal obtained from the recording signal processing circuit 12, at the above mixing circuit 22. The signal thus obtained from the mixing circuit is alternately recorded onto the magnetic tape 24 by the rotary heads 23a and 23b, in tracks such as those shown in FIG. 2.

In the present embodiment of the invention, the mutually separated frequencies f1 and f4 are respectively selected from the first frequency group $f_{a1}$ through $f_{ai}$ consisting of i arbitrary frequencies, satisfying equation (4).

$$f_{ai} = (2N_i - 1)(f_x/2) \quad (4)$$

Moreover, the frequencies f2 and f3 which are respectively approximately equal to the frequencies f1 and f4, are respectively selected from the second frequency group $f_{b1}$ through $f_{bj}$ consisting of j arbitrary frequencies, satisfying equation (5).

$$f_{bj} = (2N_j - 1)(f_y/2) \text{ (where } f_x \neq f_y) \quad (5)$$

The frequency of the first frequency group and the frequency of the second frequency group are alternately recorded in a manner such that frequencies of which are very close to each other are recorded in adjacent tracks. Accordingly, the frequencies are changed over for every recording unit of one track, that is, in the order f1, f3, f4, and f2, or f2, f4, f3, and f1. Further, in the above equations (4) and (5), $N_i$ and $N_j$ are natural numbers, and f1 through f4 are frequencies satisfying equation (6).

$$\left.\begin{array}{l}
f1 = (2 \times 13 - 1)\frac{f_H}{4} = \frac{25}{4}f_H \\
f2 = (2 \times 7 - 1)\frac{f_H}{2} = \frac{26}{4}f_H \\
f3 = (2 \times 9 - 1)\frac{f_H}{2} = \frac{34}{4}f_H \\
f4 = (2 \times 18 - 1)\frac{f_H}{4} = \frac{35}{4}f_H
\end{array}\right\} \quad (6)$$

The above pilot signals f1 through f4 are in a frequency band which is lower than the frequency band of the frequency-modulated video signal, and $f_x = (f_H/2)$, and $f_y = f_H$.

The above pilot signals are not limited to those satisfying the above equations (1), (2), (4), and (5). Two groups of frequencies f1, f4, f2, and f3 from each frequency group satisfying equations (7) and (8) can be used as pilot signals, similarly as in the above described case.

$$f_{ai} = N_i f_x \quad (7)$$

$$f_{bj} = N_j f_y \quad (8)$$

In this case, the above pilot signals f1 through f4 can be determined by equation (9). This corresponds to a case where $f_x = (f_H/2)$ and $f_y = (\frac{3}{4})f_H$ in the equations (7) and (8), and can be realized just by changing the frequency dividing ratio of the counter 18 in the recording system shown in FIG. 6.

$$\left.\begin{array}{l}
f1 = 13 \times \frac{f_H}{2} = \frac{26}{4}f_H \\
f2 = 9 \times \frac{3}{4}f_H = \frac{27}{4}f_H \\
f3 = 13 \times \frac{3}{4}f_H = \frac{39}{4}f_H \\
f4 = 20 \times \frac{f_H}{2} = \frac{40}{4}f_H
\end{array}\right\} \quad (9)$$

Next, description will be given with respect to a second embodiment of a reproducing system in the system according to the present invention. FIG. 7 is a systematic block diagram showing the second embodiment of the reproducing system in the system according to the present invention. In FIG. 7, those parts which are the same as those corresponding parts in FIG. 2 are designated by like reference numerals, and their description will be omitted. The signal reproduced from the magnetic tape 24 having the track pattern such as that indicated in FIG. 2 by the rotary heads 23a and 23b, is supplied to the preamplifier 25. The output of the preamplifier 25 is supplied to the reproduced signal processing circuit 26 on one hand wherein a predetermined signal processing such as demodulation of the frequency-modulated signal is performed, to reproduce the signal as the original composite video signal. On the other hand, the output of the preamplifier 25 is also supplied to a CCD 52 within a comb filter 51.

The phase comparator 33, the loop filter 34, and a VCO 54 construct a PLL. Moreover, the frequency dividing ratio of a counter 55 is alternately changed over between 1/455 and 1/910 by a control signal from a control circuit 56, for every reproducing unit of one track by the rotary heads 23a and 23b. Accordingly, the output oscillation frequency of the VCO 54 is alternately changed over between $455f_H$ and $910f_H$, for every reproducing unit of one track by the rotary heads 23a and 23b.

The output oscillation frequency of $455f_H$ or $910f_H$ obtained from the VCO 54 is supplied to a ½-frequency divider 57 wherein the frequency is divided into ½ the original frequency. An output of the above ½-frequency divider 57 is supplied to the CCD 52 as a clock pulse. The above CCD 52 comprises 455 steps, and when the clock pulse frequency is $(455/2)f_H$, the reproduced signal is delayed by 2H. On the other hand, when the clock pulse frequency is $(910/2)f_H$, the CCD 52 delays the reproduced signal by 1H. The output delayed reproduced signal from the CCD 52 is supplied to an adder 53 wherein the delayed reproduced signal is added with a reproduced which is not delayed obtained from the preamplifier 25. Hence, the CCD 52 and the adder 53 construct the comb filter 51. The frequency characteristic of the above comb filter 51 becomes as indicated by a solid line in FIG. 8A when the delay time T of the CCD 52 is 2H, and becomes as indicated by a dotted line when the delay time T is 1H.

Therefore, during reproducing period of one track when the delay time T of the CCD 52 is 2H, the pilot signals f2 and f3 are included within the output signal of the adder 53, however, the pilot signals f1 and f4 are intercepted and are not included within the above output signal. Moreover, during the reproducing period of one track when the delay time T of the CCD 52 is 1H, the pilot signals f1 and f4 are obtained from the adder 53, however, the pilot signals f2 and f3 are similarly intercepted and therefore not obtained.

The output signal of the adder 53 is supplied to bandpass filters 58 and 59. The bandpass filter 58 has a characteristic for passing the pilot signals f1 and f2 as indicated by a curve III in FIG. 8B. On the other hand, the bandpass filter 59 has a characteristic for passing the pilot signals f3 and f4 as indicated by a curve IV in FIG. 8B. An output signal of the above bandpass filter 58 is supplied to the fixed terminal a of the changeover switch 40 to the fixed terminal b of the changeover switch and 41, through a wave detection circuit (not shown). On the other hand, an output signal of the bandpass filter 59 is supplied to the fixed terminal b of the changeover switch 49 and to the fixed terminal a of the changeover switch 41, through a wave detection circuit (not shown). The above changeover switches 40 and 41 are linked to each other, and are changed over for every reproduction period of one track.

Upon reproduction, during the period in which the rotary head 23a is reproducing the track t5 which is recorded with the pilot signal f1, the pilot signals f2 and f3 are respectively reproduced as crosstalk from the adjacent tracks t4 and t6, as clearly seen from FIG. 2. During this reproducing period, the frequency dividing ratio of the counter 55 is set to 1/455. Moreover, the changeover switches 40 and 41 are respectively connected to the fixed terminals a. As a result, the pilot signal f1 from the track which is to be reproduced is intercepted by the comb filter 51 during this reproducing period. Furthermore, the pilot signals f2 and f3 which are reproduced as crosstalk from the adjacent tracks, are respectively supplied to the bandpass filters 58 and 59. Accordingly, the pilot signal f2 which is reproduced as crosstalk is obtained from the bandpass filter 58, and applied to the positive phase input terminal of the differential amplifier 42 through the changeover switch 40. On the other hand, the pilot signal f3 which is reproduced as crosstalk is obtained from the bandpass filter 59, and applied to the inverting phase input terminal of the differential amplifier 42 through the changeover switch 41.

In a case where the rotary head 23a shifts towards the upward direction in FIG. 2, that is, towards the direction of the track t6, and travels, the crosstalk level of the pilot signal f3 becomes relatively high compared to the crosstalk level of the pilot signal f2. Hence, the output tracking error detection voltage obtained from the differential amplifier 42 becomes low compared to the case where no tracking error exists. On the contrary, in a case where the rotary head 23a shifts towards the downward direction in FIG. 2, that is, towards the direction of the track t4, and travels, the crosstalk level of the pilot signal f3 becomes relatively low compared to the crosstalk level of the pilot signal f2. Accordingly, in this case, the output tracking error detection voltage becomes high compared to the case where no tracking error exists.

Next, during the reproducing period in which the rotary head 23b reproduces the track t6 which is recorded with the pilot signal f3 together with the frequency-modulated video signal, the frequency dividing ratio of the counter 55 is set to 1/910. Thus, the reproduced pilot signal f3 obtained from the track which is to be reproduced, is intercepted by the above described comb filter 51. Moreover, the pilot signals f1 and f4 which are reproduced as crosstalk from the adjacent tracks t5 and t7, are filtered at the bandpass filters 58 and 59. Accordingly, the pilot signal f1 is filtered at the bandpass filter 58, while the pilot signal f4 is filtered at the bandpass filter 59. In addition, during the reproducing period in which the track t6 recorded with the pilot signal f3 is reproduced, the changeover switches 40 and 41 are respectively connected to the fixed terminals a. Therefore, the above pilot signals f1 and f4 which are reproduced crosstalk and obtained through the bandpass filters 58 and 59, are respectively applied to the positive phase and inverting phase input terminals of the differential amplifier 42.

Hence, in this case, when reproduction is performed in a state where the rotary head 23b is shifted towards the upward direction in FIG. 2, the crosstalk level of the pilot signal f4 becomes relatively high compared to the crosstalk level of the pilot signal f1. Accordingly, the output tracking error detection voltage obtained from the differential amplifier 42 becomes low compared to the case where no tracking error exists. On the contrary, in a case where reproduction is performed in a state where the rotary head 23b is shifted towards the downward direction in FIG. 2, the above output tracking error detection voltage obtained from the differential amplifier 42 becomes high compared to the case where no tracking error exists.

Similarly as in the above described case, during the reproducing period in which the track recorded with the pilot signal f4 is reproduced, the frequency dividing ratio of the counter 55 is changed over and set to 1/455. On the other hand, during the reproducing period in which the track recorded with the pilot signal f3 is reproduced, the frequency dividing ratio of the counter 55 is changed over and set to 1/910. Accordingly, when the tracking error is towards the upward direction in FIG. 2, the output tracking error detection voltage obtained from the differential amplifier 42 becomes low, and the output tracking error detection voltage becomes high when the tracking error is towards the downward direction in FIG. 2.

Therefore, the pilot signals reproduced as crosstalk from the tracks adjacent to the track which is to be reproduced, are respectively obtained from the bandpass filters 58 and 59. Moreover, when reproduction is performed in a state where the rotary heads 23a and 23b are shifted towards the upward direction in FIG. 2, the output tracking error detection voltage having a low value is obtained through the output terminal 43. On the other hand, when reproduction is performed in a state where the rotary heads 23a and 23b are shifted towards the downward direction in FIG. 2, an output tracking error detection voltage having a high value is obtained through the output terminal 43. Hence, it is evident that the tracking error can be corrected by use of the above tracking error detection voltage.

Figure 9:
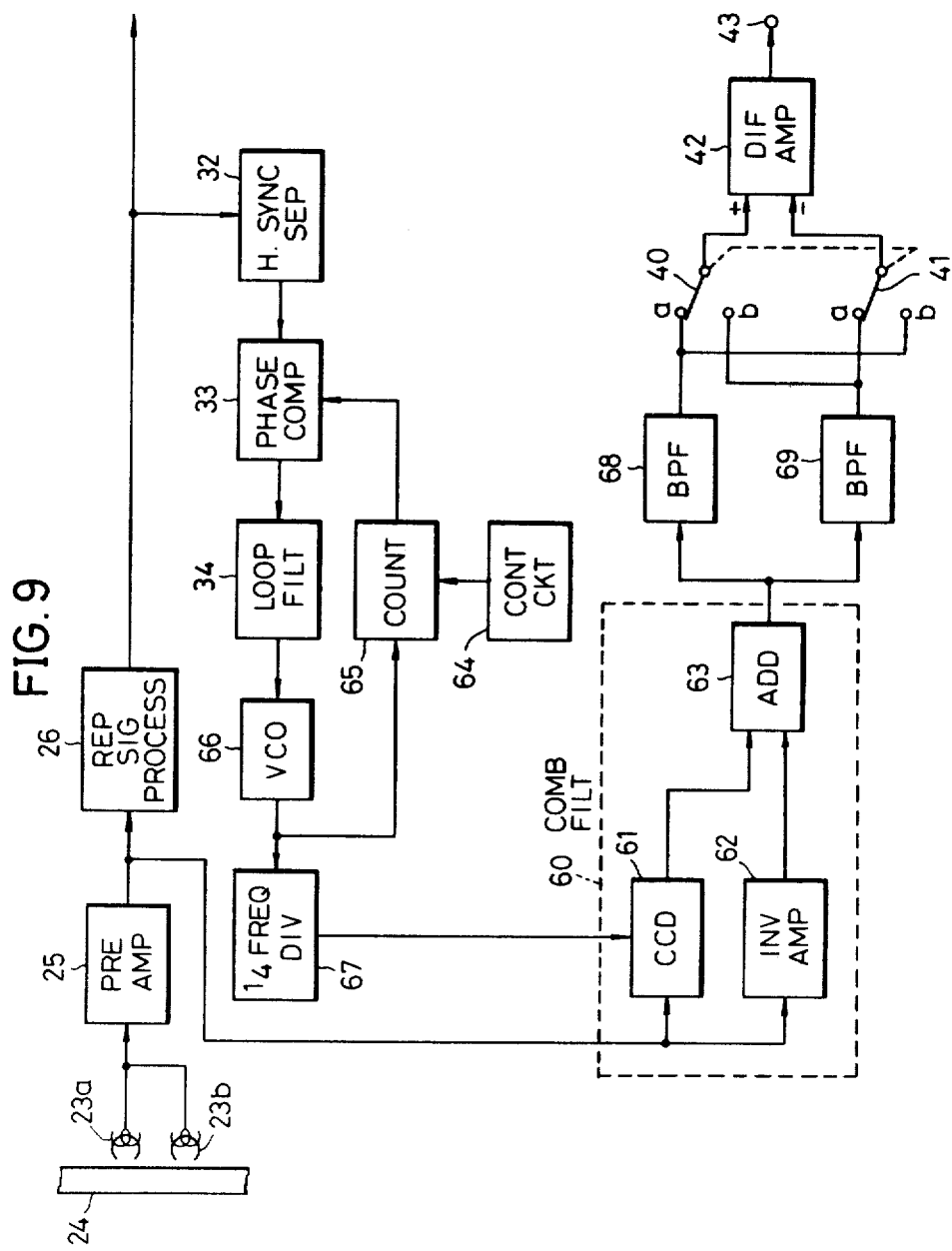
FIG. 9 is a systematic block diagram showing a third embodiment of a reproducing system in the system according to the present invention.

FIG. 9 is a systematic block diagram showing a third embodiment of a reproducing system in the system according to the present invention. This embodiment of the reproducing system is for a case where the pilot signals f1 through f4 which were described above in conjunction with the equations (7) through (9) are recorded in the oblique tracks on the magnetic tape 24. In FIG. 9, those parts which are the same as those corresponding parts in FIG. 7 are designated by like reference numerals, and their description will be omitted.

In FIG. 9, during the period in which the rotary head 23b reproduces the track recorded with the pilot signal f2 or f3, the frequency dividing ratio of a counter 65 constructing a PLL is set to 1/1365 by an output control signal from a control circuit 64. A ½-frequency divider 67 divides the output oscillation frequency of a VCO 66 into ½ the original frequency. Moreover, the delay time of a CCD 61 which is applied with a clock pulse from the above ½-frequency divider 67, is set to (4/3)H. On the other hand, during the reproducing period in which the rotary head 23a reproduces the track recorded with the pilot signal f1 or f4, the frequency dividing ratio of the counter 65 is set to 1/910, and the delay time of the CCD 61 is set to 2H. The output delayed signal from the CCD 61 is added with a reproduced signal which is inverted and amplified at an inverting amplifier 62, at an adder 63. That is, the reproduced signal obtained from the preamplifier 25 is subjected to subtraction with the reproduced signal which is delayed at the CCD 61. The above CCD 61, the inverting amplifier 62, and the adder 63 construct a comb filter 60. When the delay time of the CCD 61 is 2H, the comb filter 60 has a characteristic indicated by a solid line in FIG. 10A. On the other hand, when the delay time of the CCD 61 is (4/3)H, the above comb filter 60 has a characteristic indicated by a dotted line in FIG. 10A.

Accordingly, during the period in which the rotary head 23a reproduces the track recorded with the pilot signal f1 or f4, the pilot signals f2 and f3 determined by the equation (9) are filtered at the above comb filter 60, and the pilot signals f1 and f4 are intercepted. On the other hand, during the period in which the rotary head 23b reproduces the track recorded with the pilot signal f2 or f3, the pilot signals f1 and f4 determined by the equation (9) are filtered, and the pilot signals f2 and f3 are intercepted. The signal obtained from the adder 63 is supplied to bandpass filters 68 and 69.

The bandpass filter 68 has a characteristic for passing the frequencies f1 and f2 as indicated by a curve V in FIG. 10B. On the other hand, the bandpass filter 69 has a characteristic for passing the frequencies f3 and f4 as indicated by a curve VI in FIG. 10B. Accordingly, the pilot signals obtained as crosstalk from tracks adjacent to the track which is to be reproduced by the rotary head 23a or 23b by the above comb filter 60, are respectively supplied to the bandpass filters 68 and 69. Hence, the bandpass filters 68 and 69 respectively produce a signal by selecting each frequency.

The output signals of the bandpass filters 68 and 69 are supplied to the differential amplifier 42, respectively through the changeover switches 40 and 41. Thus, a tracking error detection voltage is produced through the output terminal 43 in a simialr manner as in the reproducing system shown in FIG. 3 or FIG. 7.

In a case where the pilot signal frequency is selected to a frequency having a specific relationship with the composite video signal which is multiplexed and recorded, the pilot signal can easily be discriminated even when fluctuation components such as wow and flutter is included in the reproduced pilot signal, by use of a variable delay element such as a CCD and bucket brigade device (BBD). Furthermore, in a case where the time axis deviation due to wow and flutter and the like can be ignored, there is no need to select the pilot signal frequency to a frequency having a specific relationship with the composite video signal. In this case, inexpensive glass delay element and the like having a fixed delay time can be changed over and used, instead of using the variable delay elements such as the CCD and the BBD.

Further the present invention is not limited to these embodiments, but various variations and modifications may be made without departing from the scope of the invention.

What is claimed is:

1. A pilot signal recording and reproducing system in which mutually different first through fourth frequencies are recorded as pilot signals on a recording medium in a specific order together with an information signal such that one pilot signal is recorded for one track, and pilot signals recorded on both sides of a track which is to be reproduced having mutually different frequencies and being included as crosstalk within a reproduced signal reproduced from said recording medium are respectively discriminated and separated by a filter circuit, to obtain a tracking error information, said pilot signal recording and reproducing system comprising:

a frequency generating circuit for successively generating a first frequency, a third frequency, a second frequency, and a fourth frequency in this frequency order or in a reverse order for every recording unit of one track, said first and second frequencies being mutually separated frequencies, selected from a first frequency group consisting of i frequencies satisfying an equation $f_{ai} = K_i \cdot f_x$ where $K_i$ is $(N_i - \frac{1}{2})$ or $N_i$ when i arbitrary natural numbers are designated by $N_i$ and $f_x$ is a predetermined frequency, said third and fourth frequencies respectively being frequencies approximately equal to said first and second frequencies, selected from a second frequency group consisting of j frequencies satisfying an equation $f_{bj} = K_j \cdot f_y$ where $K_j$ is $(N_j - \frac{1}{2})$ or $N_j$ when $K_i = N_i$ and $K_j$ is $(N_j - \frac{1}{2})$ when $K_i = (N_i - \frac{1}{2})$, when j arbitrary natural numbers are designated by $N_j$ and $f_y$ is a predetermined frequency;

a comb filter for frequency-selecting pilot signals having mutually different frequencies recorded on both sides of a track which is to be reproduced;

a control circuit for alternately changing over and controlling a delay time of a delay circuit within said comb filter to $1/f_x$ or $1/f_y$ for every reproducing period of one track; and first and second filter circuits for respectively discriminating and separating pilot signals having mutually different frequencies obtained from said comb filter.

2. A system as claimed in claim 1 in which said information signal is a composite video signal, and said frequencies $f_x$ and $f_y$ have frequency values related to the horizontal scanning frequency.

3. A system as claimed in claim 2 in which said third and fourth frequencies are selected to frequencies lower than a recording frequency band of said information signal.

4. A system as claimed in claim 1 in which, when said frequencies $f_x$ and $f_y$ are set to an identical frequency f and $K_i = N_i$, and $K_j = N_j - \frac{1}{2}$, said comb filter consists of a delay circuit for delaying said reproduced signal by a delay time of 1/f, an inverting amplifier for inverting and amplifying said reproduced signal, a changeover switch for alternately selecting and producing said reproduced signal and an output signal of said inverting amplifier for every reproducing period of one track, and an adder for respectively adding an output signal of said delay circuit and an output signal of said changeover switch.

5. A system as claimed in claim 1 in which, when said frequencies $f_x$ and $f_y$ are set to an identical frequency f and $K_i = N_i$, and $K_j = N_j - \frac{1}{2}$, said comb filter consists of a delay circuit having a delay time of 1/f, an inverting amplifier for inverting and amplifying an output signal of said delay circuit, a changeover switch for alternately selecting and producing the output signal of said delay circuit and an output signal of said inverting amplifier for every reproducing period of one track, and an adder for adding an output signal of said changeover switch and said reproduced signal, to supply an added signal to said delay circuit.

6. A system as claimed in claim 1 in which, when said frequencies $f_x$ and $f_y$ are set to mutually different frequencies, and $K_i = N_i$ and $K_j = N_j$ or $K_j = N_i - \frac{1}{2}$ and $K_j = N_j - \frac{1}{2}$, and said control circuit alternately changes over and controls the delay time of the delay circuit within said comb filter.

* * * * *